United States Patent [19]

Ohneda

[11] Patent Number: 5,734,745
[45] Date of Patent: Mar. 31, 1998

[54] IMAGE PROCESSING SYSTEM HAVING FUNCTION OF ELASTICALLY TRANSFORMING GAMUT

[75] Inventor: Shohgo Ohneda, Urayasu, Japan

[73] Assignee: Ricoh Company, Ltd., Tokyo, Japan

[21] Appl. No.: 328,698

[22] Filed: Oct. 25, 1994

[30] Foreign Application Priority Data

Oct. 27, 1993 [JP] Japan .................. 5-292699

[51] Int. Cl.$^6$ ...................... G03F 3/08
[52] U.S. Cl. .......... 382/167; 358/518; 358/521
[58] Field of Search ............... 358/501, 506, 358/518, 519, 520, 521, 525, 527, 528, 531, 537, 538; 382/167; 395/109

[56] References Cited

U.S. PATENT DOCUMENTS

| | | | |
|---|---|---|---|
| 5,231,504 | 7/1993 | Magee | 358/520 |
| 5,243,414 | 9/1993 | Dalrymple et al. | 358/518 |
| 5,309,257 | 5/1994 | Bonino et al. | 358/518 |
| 5,311,332 | 5/1994 | Imao et al. | |
| 5,311,334 | 5/1994 | Sugiura | 358/518 |
| 5,313,314 | 5/1994 | Ikegami | |
| 5,317,426 | 5/1994 | Hoshino | 358/518 |
| 5,319,473 | 6/1994 | Harrington | 358/518 |
| 5,323,249 | 6/1994 | Liang | 358/518 |
| 5,363,218 | 11/1994 | Hoshino | 358/518 |
| 5,390,035 | 2/1995 | Kasson et al. | 358/518 |
| 5,436,739 | 7/1995 | Imao et al. | |
| 5,450,216 | 9/1995 | Kasson | 358/518 |
| 5,463,480 | 10/1995 | MacDonald et al. | 358/520 |
| 5,510,910 | 4/1996 | Bockman et al. | 358/520 |
| 5,539,540 | 7/1996 | Spaulding et al. | 358/518 |

FOREIGN PATENT DOCUMENTS

| | | |
|---|---|---|
| 10362 | 1/1986 | Japan . |
| 288662 | 6/1986 | Japan . |
| 288690 | 6/1986 | Japan . |

OTHER PUBLICATIONS

Japanese book, Nikkei Electronics of Dec. 21, 1992 (No.570), pp. 84–104, Color Management.

Japanese book, Image Engineering, written by Toshi Minami and Osamu Nakamura, published by Corona Publishing Co., Ltd., Tokyo, Japan, edited by Television Society, pp. 8–25, '2.2.4 XYZ Color Representing System'.

English article, A Color Correction Method From Standardized Color–Space Signals For Printers, written by Manabu Komatsu, Shogo Ohneda, Hiroaki Suzuki and Hiroki Kubozono of Ricoh Company, Ltd., Japan (Oct.5–III–p7), in Advances In Non–Impact Printing Technologies/Japan Hardcopy '93, pp. 545–548.

*Primary Examiner*—Edward L. Coles, Sr.
*Assistant Examiner*—Kimberly A. Williams
*Attorney, Agent, or Firm*—Lowe, Price, LeBlanc & Becker

[57] ABSTRACT

A reproducing device reproduces an image indicated by given color-image data, the given color-image data having an input gamut of a color space, and the reproducing device having an output gamut of a color space, in which gamut the reproducing device reproduces the image. A transforming device elastically transforms either one of the input gamut or the output gamut so as to make either one of the gamuts to match the other one.

20 Claims, 3 Drawing Sheets

IMAGE PROCESSING SYSTEM HAVING FUNCTION OF ELASTICALLY TRANSFORMING GAMUT

BACKGROUND OF THE INVENTION

1. Field of the Invention

The present invention relates to an image processing system used in a color image forming apparatus, a color image display apparatus or the like, and particularly relates to an image processing apparatus which performs color-space-compression/stretching of image data if a color-reproduction extent of a color space of a relevant output device, that is, an output gamut is different from a color-appearance extent of a color space of a relevant input device, that is, an input gamut. Generally speaking, the input gamut depends on a particular image-signal input device such as an image scanner. The input gamut is a color-space extent, within which extent the input image data can represent colors and which extent is defined due to a capability of the relevant input device such as an image scanner supplying the input image data. The output gamut is a color-space extent, within which extent the relevant output device can reproduce colors and which extent is defined due to a capability of the relevant output device such as a printer. With regard to the basic concept of the color space, see a Japanese book, *IMAGE ENGINEERING*, written by Toshi MINAMI and Osamu NAKAMURA, published by CORONA PUBLISHING CO.,LTD., Tokho, Japan, edited by Television Society, pages 19–22, '2.2.4 XYZ Color Representing System'. Further, see an English article, *A COLOR CORRECTION METHOD FROM STANDARDIZED COLOR-SPACE SIGNALS FOR PRINTERS*, written by Manabu KOMATSU, Shogo OHNEDA, Hiroaki SUZUKI and Hiroki KUBOZONO of Ricoh Company Ltd., Japan (October 5—III—p7), in *ADVANCES IN NON-IMPACT PRINTING TECHNOLOGIES/JAPAN HARDCOPY '93*, pages 545–548r.

2. Related Art

A system for exchanging color image data using a standard signal independent of relevant input/output devices, referred to as a device-independent color-data exchanging system has been developed. Both a device-dependent and the device-independent color-exchanging system will now be described. Generally, a CRT reproduces colors using an RGB (red, green and blue) signal and a printer reproduces colors using a YMCK (yellow, magenta, cyan and black) signal. Different devices among output devices, such as the above-mentioned CRTs or printers, have different color-reproduction characteristics, the characteristics including, for example, linearity between color-data values and corresponding reproduced colors for each color component. Therefore, different output devices may reproduce different colors from the identical color signal. Color reproduction systems reproducing different colors from identical color signals are device-dependent systems. In contrast to this, device-independent color-reproduction systems are those in which input color data is input to the output device and the output colors actually obtained from the input color data through the output device's reproduction operation are actually measured. Relationship between the input color data and the actually obtained output colors is thus obtained based on the actual measurement result. Based on this input data-output colors the relationship, the operator may determine input color data from which accurately desired output colors are obtained through the output device. Thus, even if any output device among output devices having different color-reproduction characteristics is used, accurately desired colors can be obtained as a result of performing the above-described procedure in which actual output-color measurement is performed and then input-data is determined using the measurement result.

Attempts have been made to define a standard signal having the input gamut covering output gamuts of all possible particular output devices, that is, color-space reproduction extents which can be reproduced by the output devices due to capabilities thereof. The standard signal will be used to realize the above-described device-independent color-reproduction system. However, an output device cannot reproduce all colors indicated by an input color signal consisting of the standard signal. This is because an entirety of the gamut of the input color signal cannot be covered by the gamut of the output device. For example, printers acting as the output device use various types of inks/toners to reproduce colors, the inks/toners having different color characteristics. Such color-characteristic differences may result in differences in the gamuts among the printers. That is, if the inks have impure colors, it is impossible to reproduce pure colors therewith. See NIKKEI ELECTRONICS of Dec. 21, 1993 (No. 570), pages 84–104, COLOR MANAGEMENT.

In such a case as that described above in which not every color represented by the input color signal can be reproduced by the output device, in order to appropriately process colors which cannot be reproduced by the output device, first and second methods have been proposed as described below. With regard to the first method, see Japanese Laid-Open Patent Application No.61-10362. The first method is a method in which only the colors which cannot be reproduced are converted into other reproducible colors closest to the colors which cannot be reproduced. The second method is a method in which the gamut of the input color signal is compressed/stretched so as to be adapted to the gamut of the output device (according to a capability of the output device) in some way.

However, methods in the related art such as the above-described first and second methods have problems as described below. Although the first method is a simple method, tone gradation at an outline edge of gamut of output device is distorted and thus image quality is degraded. The second method is effective to prevent such tone-gradation distortion. However, all proposed compression/stretching methods compress the gamut of output device so that data is compressed evenly throughout the gamut of output device. With regard to the proposed methods, see Japanese Patent Publication No.5-88589. In the above-mentioned even compression, directions along which compression is performed are even.

There may be a case where the gamut of the given input signal is different from the gamut of the output device (according to a capability of the output device) so that not only a size but also a shape of the former gamut is greatly different from a size and a shape of the latter gamut. In such a case as that in which the shape of the former gamut is greatly different from the shape of the latter gamut, it may be necessary to greatly compress to make the latter gamut match the former gamut. Through such a great compressing of the gamut, for example, the color-space compression may be strongly performed toward a point representing white in the color space. Such compression transformation of the gamut may distort the color space so that a coordinate axis of the color space representing color saturation may be undesirably compressed. As a result, color brightness is lost in the reproduced colors. Therefore, colors of a reproduced color image resulting from the color reproduction through the above-mentioned compression may be degraded as a result of a middle part of the gamut of output device is exceedingly distorted. Such a method may compress a partial gamut which the output device can not reproduce but may not compress a wide gamut which the output device can reproduce. Thus, the color-reproduction capability of the output device cannot be effectively used.

Another gamut compression/stretching method has been proposed in which directions of the compression/stretching are controlled according to the shape of the gamut of output device. See Japanese Laid-Open Patent Application No.61-288662. However, in this method, compression/stretching operations are performed such that hue is fixed and brightness/saturation are compressed/stretched at an outermost part of the gamut. In such a method, image quality is not sufficiently improved.

SUMMARY OF THE INVENTION

An object of the present invention is to realize a gamut compression/stretching process for adapting a color signal to an output device having the gamut different from the gamut of the given input color signal. Through the process according to the present invention, even if the shape of the output gamut which is a gamut that the output device can reproduce is different from the shape of the gamut which the input color data includes, no tone-gradation distortion occurs, the capability of the output device can be most effectively used, and high-grade and high-quality image can be obtained, in the gamut compression/stretching process.

In order to achieve the object of the present invention, an image processing system is provided. The image processing system comprises:

reproducing means for reproducing an image indicated by a given color-image data, the given color-image data having an input gamut, said reproducing means having an output gamut in which said reproducing means reproduces the image;

transforming means for elastically transforming either one of said input gamut or said output gamut so as to make said either one of the gamuts to match the other.

The elastic transformation can prevent problematic tone-gradation distortion from appearing in an image indicated by the image data having undergone the elastic transformation. As mentioned above, a conventional compression method such as that disclosed by Japanese Patent Publication No.5-88589 compresses the color space evenly. However, in the elastic transformation, transformation directions depend on a shape of an original gamut.

The image processing system according to the present invention further comprises specifying means for an operator to set parameters specifying transformation manners of the elastic transformation of either one of said input gamut or said output gamut; and display means for displaying said one of said input gamut or said output gamut;

an operator being able to set the parameters through said specifying means by viewing said one of said input gamut or said output gamut through said display means.

As a result, the elastic transformation operation may be performed interactively with the image processing system so that intentions of the operator can be effectively reflected in the elastic transformation operation and thus work efficiency can be improved.

The image processing system according to tea present invention further comprises;

dividing means for dividing either one of said input gamut or said output gamut into a plurality of small parts; and coefficient-setting means for setting elastic coefficients for each part of said plurality of small parts;

said transforming means performing the elastic transformation according to said elastic coefficients.

As a result, manners of the elastic transformation can be finely controlled part by part in the input gamut or the output gamut and thus it is possible to achieve a high-quality image reproduction.

In the image processing system according to the present invention, said coefficient-setting means sets the elastic coefficients according to color-reproduction densities of said reproducing means if the output gamut of said reproducing means is elastically transformed by said transforming means, and said coefficient-setting means sets the elastic coefficients according to color-appearance densities of the input image data if the input gamut of said input image data is elastically transformed by said transforming means.

As a result, the elastic transformation can be performed according to either a color distribution of the input gamut of the input image data or a color distribution of the output gamut of the reproducing means. Specifically, many colors may be allocated for a part for which the reproducing means can reproduce many colors when the output gamut of the reproducing means is elastically transformed. Instead of this, many colors may be allocated in for a part at which the colors appear in the input gamut of the input image data when the input gamut of the input image data is elastically transformed.

The image processing system according to the present invention further comprises point-determining means for determining a point in either one of said input gamut or said output gamut, said one of said input gamut or said output gamut being elastically transformed by said transforming means so that said point is fixed during the elastic transformation.

Thus, priority can be given to reproduction of an achromatic color or priority can be given to reproduction of a specific color by specifying the point corresponding to the achromatic color or the specific color.

Other objects and further features of the present invention will become more apparent from the following detailed description when read in conjunction with the accompanying drawings.

DESCRIPTION OF THE PREFERRED EMBODIMENT

Figure 1:
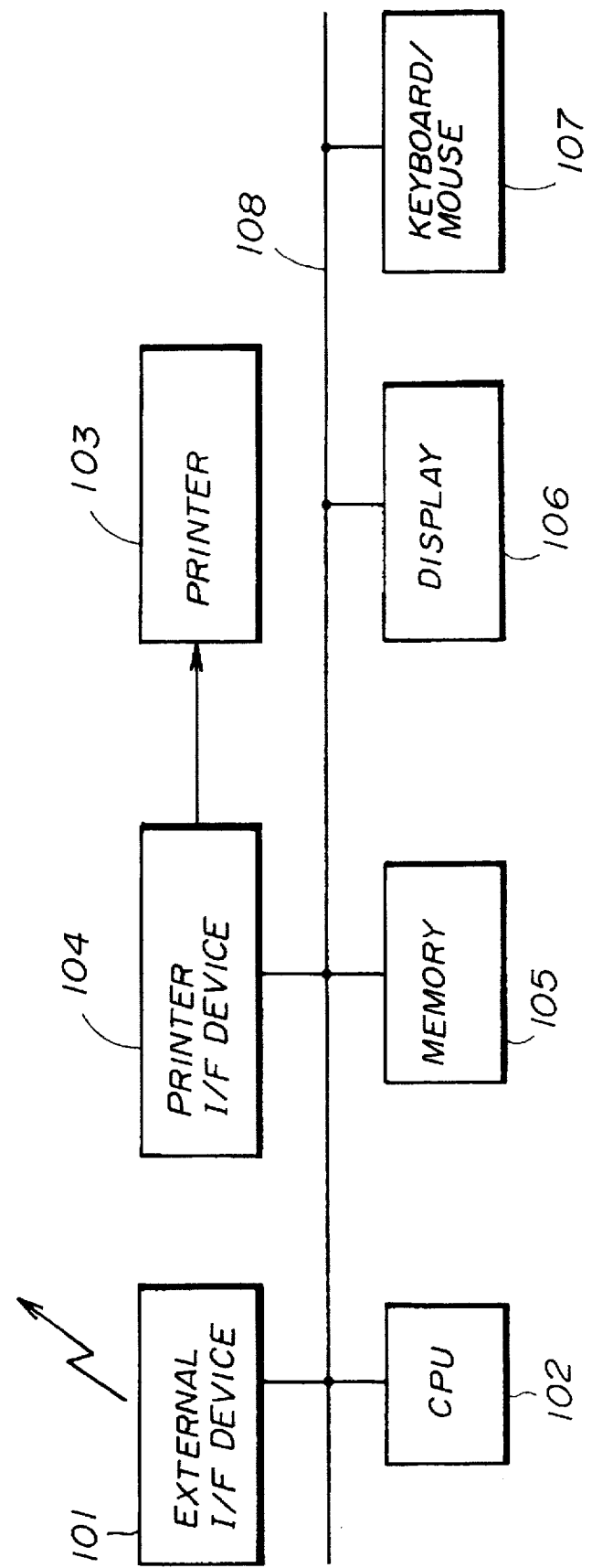
FIG. 1 shows a block diagram of a general construction of an image processing system in an embodiment of the present invention.

With reference to FIG. 1, a general construction of an image processing system in an embodiment of the present invention will now be described. Image data is input to the image processing system through an external interface (I/F) device 101 and the thus input image data will be processed in the image processing system. A CPU 102 controls all of the image processing system according to a control program. A printer 103 prints out the image data on a recording sheet and a printer interface (I/F) device 104 controls communication between the image processing system and the printer 103. A memory 105 appropriately stores the image data. A display 106 displays on a screen the image data and a keyboard/mouse 107 is used by an operator to input necessary information into the image processing apparatus. The various information items include instructions to indicate an elastic coefficient of a small part of the gamut which will be described later, instructions to indicate a position for some purpose, and so forth. The above units are connected by a system bus 108 which enables the units to communicate with one another.

The operation performed in the image processing system will now be described. The image data input through the external I/F device 101 is stored in the memory 105 and displayed through the display 106. The operator may perform a color process on the image data through the keyboard/mouse 107. The image data which has undergone the color process is printed out through the printer 103 via the printer I/F device 104, or alternatively, is displayed through the display 106 again.

There may be a case where a color-space input gamut of the image data input through the device 101 is different from the a color-space output gamut of an output device, that is, the printer 103 or the display 106. The output gamut depends on a capability of the output device. In such a case, it is possible, through the image processing system, to compress/stretch either the gamut of the input image data or the gamut of the output device so that the gamuts become identical. Thus, all colors indicated by the image data can be reproduced by the output device.

An Example of a Color-Space compression/stretching process will now be described with reference to FIGS. 2–5. In this description, the gamut, which is actually a three-dimensional gamut, is expressed as being a two-dimensional gamut in a-b color coordinates for the sake of simplicity. It is assumed that the input image data has the gamut S1 shown in FIG. 2 and the printer 103 has the gamut S2 shown in FIG. 3 to be used to print out the image data. Each of the two gamuts S1 and S2 is a hexagon but the size of the gamut S1 is larger than that of the gamut S2 and shapes of the gamuts S1 and S2 are greatly different from each other, as shown in the figures.

Figure 2:
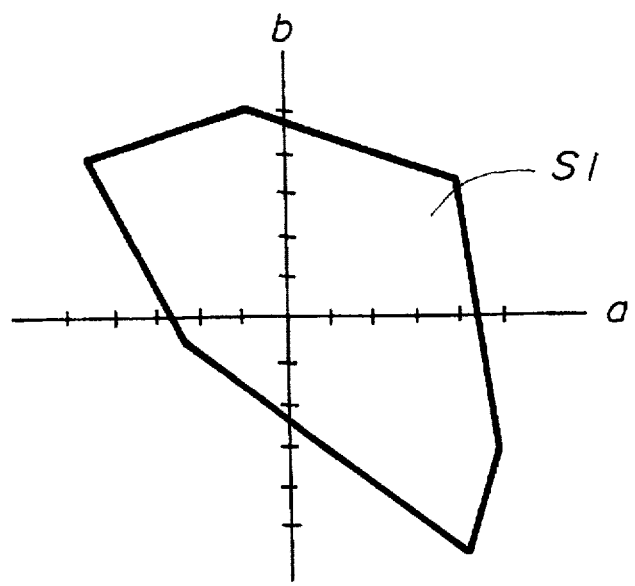
FIG. 2 illustrates an input gamut which is a gamut that an input image data can have, the input image data being input to the image processing system shown in FIG. 1.

In this case, it is necessary to approximately compress the gamut S1 of the input image data shown in FIG. 2 so that the gamut S1 of the input image matches the gamut S2 of the printer 103. Then, the thus matched gamut of the image data is projected on the gamut S2 of the printer 103 so that the gamuts precisely overlap each other. Thus, all the colors indicated by the input image data can be reproduced by the printer 103. Instead of the approximate compression of the gamut S1 of the input image data, a similar result can be obtained as a result of approximately stretching the gamut S2 of the printer 103 so that the gamut of the printer 103 matches the gamut S1 of the input image. Then, the gamut S1 of the image data is projected on the thus matched gamut of the printer 103 so that the gamuts precisely overlap each other.

According to the present invention, the above color-space compression/stretching is performed such that either one of the two gamuts is elastically transformed. As a result, the color-space compression/stretching process does not result in problematic tone-gradation distortion appearing in an image obtained as a result of printing out the image data. Thus, natural tone graduation can be realized in the printed image. Arrows shown in FIG. 4 approximately indicate directions along which the elastic transformation is performed and the length of the arrows approximately indicates magnitudes of forces which cause the elastic transformation by which the gamut S1 is manipulated to match the gamut S2. These directions and magnitudes of forces are obtained as a result of performing a simulation operation as will now be described.

A principle of the color-space elastic transformation will now be described. First, it is assumed that the gamut consists of a substance having predetermined elasticity such as a rubber and having an initial shape corresponding to an initial shape of the gamut. Next, a final shape of the gamut to result from the transformation is determined arbitrarily. Accordingly, a final shape of the above-mentioned substance corresponding to the thus determined final shape of the gamut is obtained. Then, the simulation operation to obtain a transformation state of the substance is performed in a condition where the initial shape of the substance will be changed into the final shape due to the transformation. During the simulation operation, the directions and magnitudes of mechanical forces being applied to the substance are obtained. Then, movement of each part of the substance resulting from the transformation due to the mechanical forces is obtained from the simulation operation. According to the movement of each part of the substance, corresponding part of the gamut is moved. Thus, the gamut is transformed.

Figure 3:
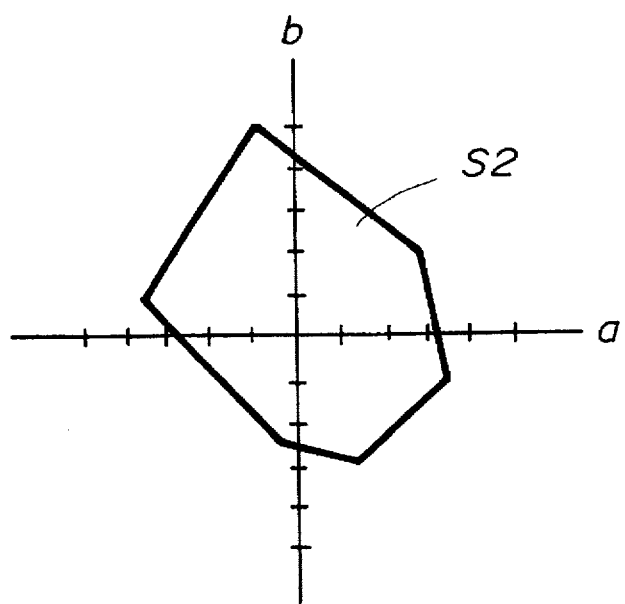
FIG. 3 illustrates an output gamut which is a gamut that a printer can reproduce, the printer being shown in FIG. 1.
Figure 5:
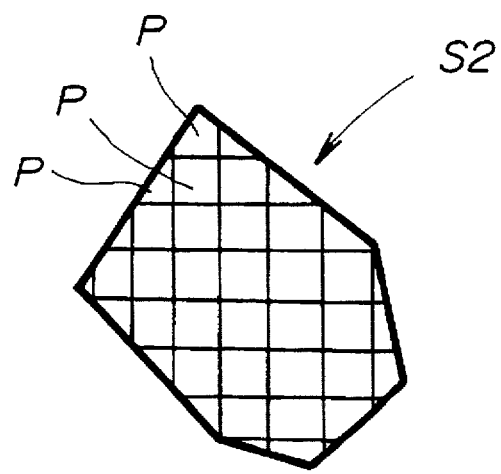
FIG. 5 illustrates a gamut in the example of the elastic-transformation process performed by the image processing system shown in FIG. 1.

Specifically, the above elastic deformation is performed as follows: If the gamut S2 of the output device, that is, the printer 103 or the display 106, is controlled, the gamut S2 shown in FIG. 3 is divided into a plurality of small parts P, as shown in FIG. 5. It is assumed that each part P of the plurality of small parts P has an elastic coefficient uniform through all the extent of the part. A well-known finite-element method is used and thus transformation states of the plurality of small parts P resulting from the elastic transformation are simulated. The elastic coefficient of each part P of the plurality of small parts P may be input to the image processing system by the operator through the keyboard/mouse 107 or the like. The elastic coefficient of each part P of the plurality of small parts may be determined as follows: First, the number of colors, which can be reproduced by the output device, that is, the printer 103 or display 106, are included in the part P of the plurality of small parts P, and are counted; and the elastic coefficient of the part is determined according to a value obtained as a result of the counting.

The above-mentioned color counting may be performed, for example, as a result of obtaining colors which are represented by image data, that is digital data input to the output device either by actual measurement or by a simulation operation. The number of colors, among the thus obtained colors, included in a relevant part in the gamut is counted.

If the gamut of the input image data such as that of S1 shown in FIG. 2 is controlled, the gamut S1 is divided into a plurality of small parts similar to the case where the gamut of the output device is controlled. Then, the number of colors appearing in each part of the plurality of small parts is counted and the elastic coefficient of the part is determined according to a value obtained as a result of the counting.

Figure 4:
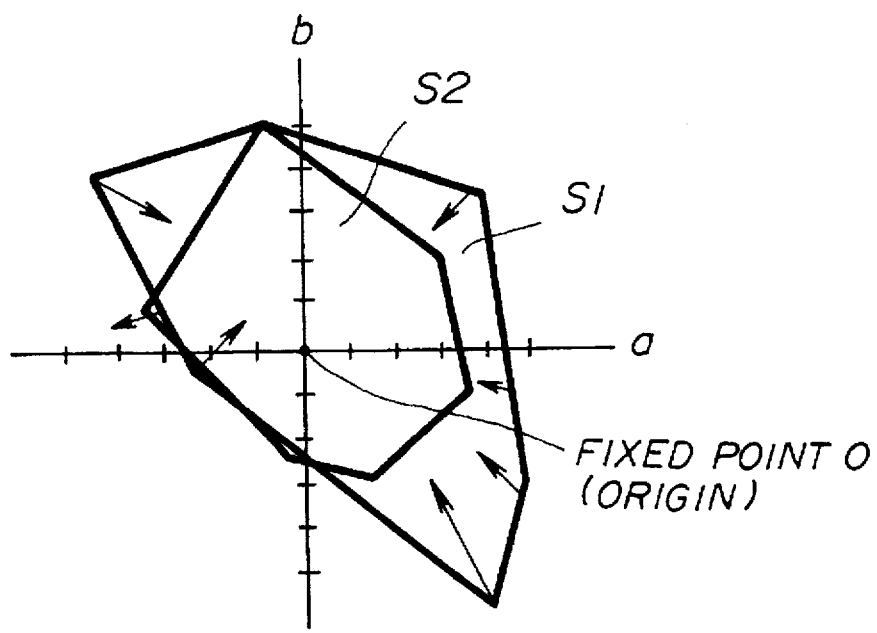
FIG. 4 illustrates gamuts in an example of an elastic-transformation process performed by the image processing system shown in FIG. 1.

Such elastic transformation may be performed in a condition where one point which is specified in the gamut is fixed. Specifically, as shown in FIG. 4, a point O indicates the origin of the a-b color coordinates and thus indicates an achromatic color. If the point O is moved during the elastic transformation, color data undesirably indicating white becomes color data indicating a color other than white, for example, yellow. Since such a data exchange state is a problematic one, image data located at the point O has to be fixed during the elastic transformation. Instead of determining image data located at the origin O of the color coordinates to be data which is fixed during the transformation, image data located at another arbitrary point can be determined to be fixed. Such determination may be performed by the operator as follows: The operator first views an image indicated by the image data, which image is displayed through the display 106 and is to be processed, and then the operator specifies an arbitrary point in the image as a result of specifying a position on the screen of the display 106 through a pointing device such as the keyboard/mouse 107. The image processing system detects a color of the thus specified point from the displayed image and obtain a point in the color coordinates corresponding to the thus detected color. The image processing system uses the thus obtained point so that image data located at this point is fixed during the transformation.

It is also possible to form the image processing system such that the display 106 displays a shape of the gamut. The operator may specify the elastic coefficients of the plurality of small parts and also specify a point in the gamut. The image processing system fixes image data located at the thus specified point during the elastic transformation. Then, after the image processing system performs the elastic transformation, the display 106 displays a result of the elastic transformation. The operator may control the transformation result interactively with the image processing system, that is, the operator performs a dialogue with the image processing system. In the dialogue, the operator may specify various elastic coefficients and various points, the image processing system fixing image data located at these points during the transformation, by viewing the preceding transformation result. Thus, the image transformation system again performs the current transformation operation according to the thus specified information and thus displays, through the display 106, the result of the current transformation operation. The operator may thus view the transformation states and then determine other elastic coefficients and a point, the image processing system fixing image data located at this point during the transformation, in order to obtain the transformation result approximate to a desired one. Such an interactive and trial-and-error operation is repeated appropriately and thus the desired result can be obtained. As a result, the elastic transformation of the image can be performed in the optimum way.

Instead of using a pointing device such as the keyboard/ mouse 107 to specify a point on the screen of the display 106, the image processing system may have coordinate specification means for specifying coordinates on the screen for the same purpose. Thus, the coordinate specification means is used by the operator to specify an arbitrary point on the screen of the display 106 so that a corresponding point in an image displayed on the screen and to be processed is specified. The image processing system fixes image data, corresponding to the thus specified point in the image, during the elastic transformation of the gamut.

Advantages obtained from the above-described image processing system in the embodiment of the present invention will now be described. The gamut of either one of the input image data and the output device is elastically transformed to match either one of the gamuts with the other. Then, after the elastic transformation, the image data is supplied to the output device, that is, the printer 103 and/or the display 106. Therefore, even if a shape of the gamut of the input image data is different from that of the output device, a relevant image can be reproduced such that no problematic tone-gradation distortion appears in the image and the capability of the output device can be most effectively used. Thus, an improved image can be obtained.

Further, the elastic transformation operation may be performed in which a result of the transformation is displayed through the display 106. The operator performs the color-space transformation operation interactively with the image processing system as described above. In the interactive operation, the operator may specify arbitrary parameters necessary to determine manners of the transformation and the operator can confirm a result obtained from the thus specified parameters. Thus, the operator's intentions are effectively reflected in the result of the transformation and thus work efficiency can be improved.

Further, the image processing system divides the gamut into a plurality of small parts and sets elastic coefficients for each part of the plurality of small parts as described above. The elastic transformation is performed according to the elastic coefficients. Thus, manners of the compression/ stretching of the elastic transformation can be appropriately controlled for each part of the plurality of small parts.

Further, the elastic-coefficient setting may be performed according to the reproduction color densities of the output device so that the gamut of the output device is elastically transformed, according to the thus set elastic coefficients, to match the gamut of the output device with the gamut of the input image data. Instead of this, the elastic-coefficient setting may be performed according to the color appearance densities of the input image data so that the gamut of the input image data is elastically transformed, according to the thus set elastic coefficients, to match the gamut of the input image data with the gamut of the output device. These coefficients may be set so that, as a result, as substantially more colors are allocated in a finally obtained image for a part of the gamut, a color appearance density increases at this part of the input image data. As a result, a natural output image can be obtained since a transformation process the most suitable for a given image can be performed on the image.

Further, a point in the gamut may be determined to be fixed during the elastic transformation process. Thus, priority can be given to reproduction of an achromatic color or to reproduction of a specific color.

Specifically, colors which the output device can reproduce are not always distributed in the gamut evenly. Instead, the color distribution may be biased according to characteristics of the output device. As described above, these characteristics include linearity between color-data values and corresponding finally reproduced colors for each color component, that is, gamma characteristics. If tone gradation in a finally reproduced image is essential, it is better not to perform a transformation process which does not use the colors which the output device can reproduce. In order to obtain a desired result using only the colors which the output device can reproduce, many colors are allocated in parts of the gamut for which parts the output device has many reproducible colors. This can be achieved by enlarging the elastic coefficients of the above-mentioned parts in the gamut so that transformation of the parts is not easy and/or by determining points located in the parts to be fixed in the transformation process, as described above. Similarly, color-distribution unevenness may be present in an image to be reproduced, the image being represented by the input image data. In such a case, if tone gradation of the image to be reproduced is essential, matters similar to the above-mentioned matters can be said. In such a case, fine-tone gradation can be achieved by enlarging the elastic coefficients of parts in the gamut, in which parts color density is high.

Further, the present invention is not limited to the above-described embodiments, and variations and modifications may be made without departing from the scope of the present invention.

What is claimed is:

1. An image processing system comprising:

reproducing means for reproducing an image indicated by given color-image data, the given color-image data having an input gamut of a color space and said reproducing means having an output gamut of a color space in which said reproducing means reproduces the image; and transforming means for elastically transforming either one of said input gamut or said output gamut so as to make said either one of the gamuts match the other one.

2. The image processing system according to claim 1, further comprising specifying means for an operator to set parameters specifying transformation manners of the elastic transformation of either one of said input gamut or said output gamut; and display means for displaying said either one of said input gamut or said output gamut;

an operator being able to set the parameters through said specifying means by viewing said one of said input gamut or said output gamut through said display means.

3. The image processing system according to claim 2, wherein the elastic transformation is performed interactively such that, when the operator sets parameters specifying transformation manners of the elastic transformation of either one of said input gamut or said output gamut are set by the operator, the display substantially simultaneously displays said either one of said input gamut or said output gamut transformed as a result of the parameters set by the operator.

4. The image processing system according to claim 2, wherein the parameters set by the operator include the magnitude and direction of the forces by which said one of said input gamut or gamut is transformed in the elastic transformation.

5. The image processing system according to claim 1, further comprising point-determining means for determining a point in either one of said input gamut or said output gamut, said either one of said input gamut or said output gamut being elastically transformed by said transforming means so that said point is fixed during the elastic transformation.

6. The image processing system according to claim 5, wherein said point is determined in accordance with a specification made by an operator.

7. The image processing system according to claim 6, wherein said system gives priority to the reproduction of a color corresponding to said specified point during the elastic transformation.

8. The image processing system according to claim 1, wherein said transforming means elastically transforms said output gamut so as to make said output gamut match said input gamut.

9. The image processing system according to claim 1, further comprising dividing means for dividing either one of said input gamut or said output gamut into a plurality of small parts and coefficient-setting means for setting elastic coefficients for each part of said plurality of small parts;

said transforming means performing the elastic transformation according to said elastic coefficients.

10. The image processing system according to claim 9, wherein said dividing means divides said output gamut into a plurality of small parts, said coefficient-setting means sets elastic coefficients for each part of said plurality of small parts, and said transforming means elastically transforms said output gamut according to said elastic coefficients so as to make said output gamut match said input gamut.

11. The image processing system according to claim 9, wherein said elastic coefficients are set in accordance with the direction and magnitude of mechanical forces obtained from a simulation operation in which a substance having a predetermined elasticity is transformed from an initial shape corresponding to an initial shape of said either one of said input gamut or said output gamut into a final shape corresponding to the other one of said input gamut or said output gamut.

12. The image processing system according to claim 9, wherein each one of said elastic coefficients are set in accordance with a value obtained as a result of counting the number of colors appearing in a corresponding one of said plurality of small parts.

13. The image processing system according to claim 9, wherein said coefficient-setting means sets the elastic coefficients according to color-reproduction densities of said reproducing means if the output gamut of said reproducing means is elastically transformed by said transforming means and sets the elastic coefficients according to color-appearance densities of the input image data if the input gamut of said input image data is elastically transformed by said transforming means.

14. The image processing system according to claim 1, wherein said system further comprises an external interface device putting said given image data on a common system bus;

wherein said transforming means comprises a CPU, a memory, a display and an operator input device, each connected to one another and to said external interface device via said common system bus; and wherein said reproducing means comprises a printer interface device connected to said common system bus and a printer receiving and printing image signals output from said printer interface device.

15. The image processing system according to claim 1, wherein the system holds at least one point, specified by an operator, in either one of said input gamut or said output gamut fixed during said elastic transformation.

16. The image processing system according to claim 15, wherein said at least point in either one of said input gamut or said output gamut corresponds to the color of a display of the image at a point which is specified by the operator.

17. An image processing system, comprising:

reproducing means for reproducing an image indicated by given color-image data, the given color-image data having an input gamut of a color space and said reproducing means having an output gamut of a color space in which said reproducing means reproduces the image;

transforming means for elastically transforming either one of said input gamut or said output gamut so as to make either one of said input or output gamuts match the other one; and means for setting elastic coefficients associated with one of said input gamut and said output gamut in accordance with direction and magnitude of mechanical forces obtained from a simulation operation in which a substance having a predetermined elasticity is transformed from an initial shape corresponding to that of said either one of said input gamut and said output gamut into a final shape corresponding to the other one of said input gamut and said output gamut.

18. The image processing system according to claim 17, further comprising dividing means for dividing either one of said input gamut or said output gamut into a plurality of small parts;

said elastic coefficient setting means being configured for setting elastic coefficients for each part of said plurality of small parts.

19. An image processing method for reproducing an image indicated by given color-image data having an input gamut of a color space, and wherein a reproducing means has associated therewith an output gamut of a color space in which the reproducing means reproduces the image, comprising the step of:

elastically transforming either one of said input gamut and said output gamut so as to make said either one of said gamuts match the other one by setting elastic coefficients in accordance with the direction and magnitude of mechanical forces obtained from a simulation operation in which a substance having a predetermined elasticity is transformed from an initial shape corresponding to an initial shape of either one of said input gamut and said output gamut into a final shape corresponding to the other one of said input gamut and said output gamut.

20. The image processing method of claim 19, including dividing said either one of said input gamut and said output gamut into a plurality of small parts, setting elastic coefficients for each part of said plurality of small parts, and performing elastic transformation according to said elastic coefficients.

* * * * *